(12) United States Patent  
Franklin et al.

(10) Patent No.: US 12,672,739 B2  
(45) Date of Patent: Jul. 7, 2026

---

(54) BARBECUE PIT COOKER SYSTEM AND METHOD

(71) Applicant: Brisket Island LLC, Austin, TX (US)

(72) Inventors: Aaron Franklin, Austin, TX (US);  
Stacy Franklin, Austin, TX (US)

( * ) Notice: Subject to any disclaimer, the term of this patent is extended or adjusted under 35 U.S.C. 154(b) by 1046 days.

(21) Appl. No.: 17/428,480

(22) PCT Filed: Mar. 19, 2021

(86) PCT No.: PCT/US2021/023258  
§ 371 (c)(1),  
(2) Date: Aug. 4, 2021

(87) PCT Pub. No.: WO2021/188963  
PCT Pub. Date: Sep. 23, 2021

(65) Prior Publication Data  
US 2022/0296040 A1     Sep. 22, 2022

(51) Int. Cl.  
*A47J 37/07* (2006.01)  
*A23B 4/044* (2006.01)  
*A23B 4/052* (2006.01)

(52) U.S. Cl.  
CPC ........... *A47J 37/0704* (2013.01); *A23B 4/044* (2013.01); *A23B 4/052* (2013.01); *A23B 4/0523* (2013.01); *A47J 2202/00* (2013.01)

(58) Field of Classification Search  
CPC ....... A23B 4/044; A23B 4/052; A23B 4/0523; A47J 37/0704; A47J 2202/00  
USPC ...................................... 126/25 R  
See application file for complete search history.

(56) References Cited

U.S. PATENT DOCUMENTS

| | | | |
|---|---|---|---|
| 2,471,375 A | 5/1949 | Moseley | |
| 3,699,876 A | 10/1972 | Ellis | |
| 3,709,140 A | 1/1973 | Rickhoff, Jr. | |
| 3,756,140 A | 9/1973 | Kolivas | |
| 3,861,288 A | 1/1975 | Cluff, Sr. et al. | |
| 5,078,049 A | 1/1992 | Glanton | |
| 5,481,964 A | 1/1996 | Kitten | |

(Continued)

FOREIGN PATENT DOCUMENTS

| | | | |
|---|---|---|---|
| BR | MU9002043-0 U2 | 5/2013 | |
| BR | MU9002043 U2 * | 5/2013 | |

(Continued)

OTHER PUBLICATIONS

BR MU9002043 U2—Translation (Year: 2013).*

*Primary Examiner* — Steven B Mcallister  
*Assistant Examiner* — Benjamin W Johnson  
(74) *Attorney, Agent, or Firm* — The Langley Law Firm, P.C.

(57) ABSTRACT

A system includes a firebox connected to the cook chamber, an exchange plate opening between the cook chamber and the firebox for fluid flow between the firebox and the cook chamber, a heat deflector connected to inside the cook chamber above the exchange plate opening, a smoke collector connected to the cook chamber opposite the firebox, for accumulation of fluid flow from the cook chamber, a smokestack connected to the smoke collector for expulsion of fluid flow from the smoke collector, and a cooking grate located inside the cook chamber extending from below the heat deflector to a base of the smoke collector. The system operates as a barbecue pit cooker and may be optimized for cooking meats.

8 Claims, 5 Drawing Sheets

(56)                    References Cited

U.S. PATENT DOCUMENTS

| | | | |
|---|---|---|---|
| 6,209,533 B1 | 4/2001 | Ganard | |
| 6,874,496 B2 | 4/2005 | Waits et al. | |
| 6,935,326 B1 | 8/2005 | Willis | |
| 2007/0028914 A1* | 2/2007 | Galdamez | A23B 4/052 |
| | | | 126/29 |
| 2008/0098906 A1 | 5/2008 | Davis | |
| 2010/0263654 A1* | 10/2010 | Cusack | A47J 37/0754 |
| | | | 126/25 R |
| 2012/0012096 A1* | 1/2012 | Cusack | A47J 37/0786 |
| | | | 432/3 |
| 2014/0030401 A1* | 1/2014 | Cusack | A47J 37/0763 |
| | | | 99/473 |
| 2018/0028018 A1* | 2/2018 | Barnett | A47J 37/0786 |

FOREIGN PATENT DOCUMENTS

| | | | |
|---|---|---|---|
| DE | 202010015641 U1 | 5/2011 | |
| WO | WO2019086235 A1 | 5/2019 | |

* cited by examiner

SECTION

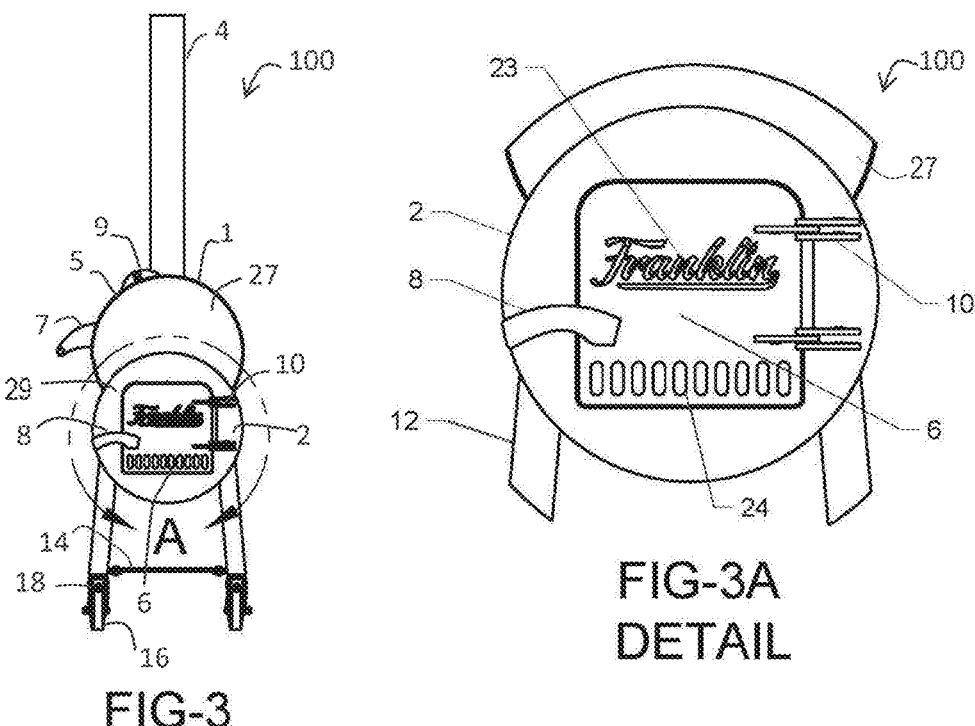
FIG-3
FIG-3A
DETAIL
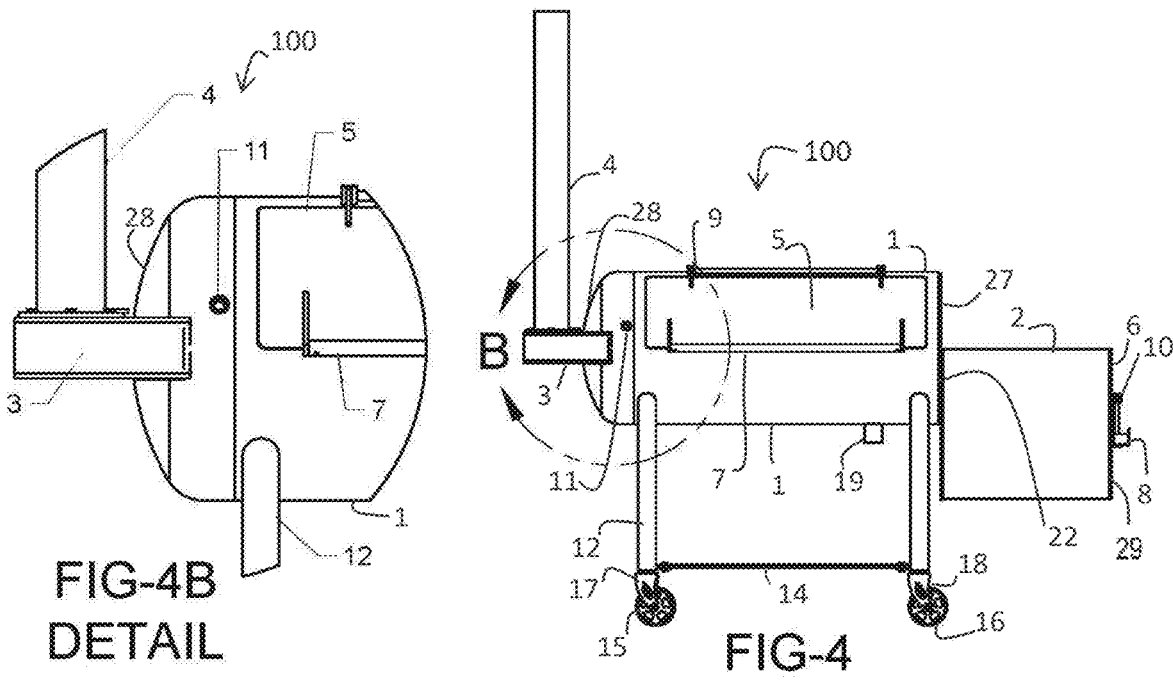
FIG-4B
DETAIL
FIG-4

SECTION

SECTION

BARBECUE PIT COOKER SYSTEM AND METHOD

TECHNICAL FIELD

The invention generally relates to barbecue pits, and more particularly relates to construction and design of offset barbecue pits and heat deflector and smoke collector thereof.

BACKGROUND

Barbecuing meat via offset cooker is the process of cooking and flavoring food by exposing it to smoke and heat from burning wood. Commercial offset wood cookers provide the purest flavor, but they require the most care relative to other barbecuing instruments because they are more difficult to adjust and keep constant airflow and temperature. The proper combination of airflow and heat from fuel results in convection whereby fluids (including gases and smoke) circulate with the warmer parts moving up and the cooler parts moving down. Determining the most efficient convection to smoke meats that maximize flavor, texture, moisture, and fat is typically determined through a laborious process of trial and error.

The present inventor has spent over seventeen years perfecting an offset cooker design. This design provides accelerated convection that maximizes airflow enabling a much higher combustion temperature that transitions from oil soluble particulates to water soluble particulate, yielding a cleaner flavor.

SUMMARY

An embodiment of the invention is a system including a cook chamber, a firebox connected to the cook chamber, an exchange plate opening between the cook chamber and the firebox for fluid flow between the firebox and the cook chamber, a heat deflector connected to inside the cook chamber above the exchange plate opening, a smoke collector connected to the cook chamber opposite the firebox, for accumulation of fluid flow from the cook chamber, a smokestack connected to the smoke collector for expulsion of fluid flow from the smoke collector, and a cooking grate located inside the cook chamber extending from below the heat deflector to a base of the smoke collector.

Another embodiment of the invention is a method of manufacture of a barbecue pit cooker. The method includes providing a cook chamber, connecting a firebox to the cook chamber, forming an exchange plate opening between the cook chamber and the firebox, forming airflow slots in the firebox, connecting a smoke collector to the cook chamber opposite the firebox, connecting a smokestack to the smoke collector, connecting a heat deflector inside the cook chamber, near a top of the exchange plate opening, extending into the cook chamber, and connecting a cooking grate inside the cook chamber below the heat deflector and near a base of the smoke collector.

Yet another embodiment of the invention is a barbecue pit cooker manufactured in accordance with the methods.

BRIEF DESCRIPTION OF THE DRAWINGS

The present invention is illustrated by way of example and not limitation in the accompanying figures, in which like references indicate similar elements, and in which:

FIG. 3 illustrates a right side view of a system for barbecue cooking, according to certain embodiments of the invention;

FIG. 3A illustrates an expanded view of a portion A of FIG. 3 of a right side view of a system for barbecue cooking, according to certain embodiments of the invention;

FIG. 4 illustrates a front view of a system for barbecue cooking, according to certain embodiments of the invention;

FIG. 4B illustrates an expanded view of a left portion B of FIG. 4 of a system for barbecue cooking, according to certain embodiments of the invention;

DETAILED DESCRIPTION

Figure 1:
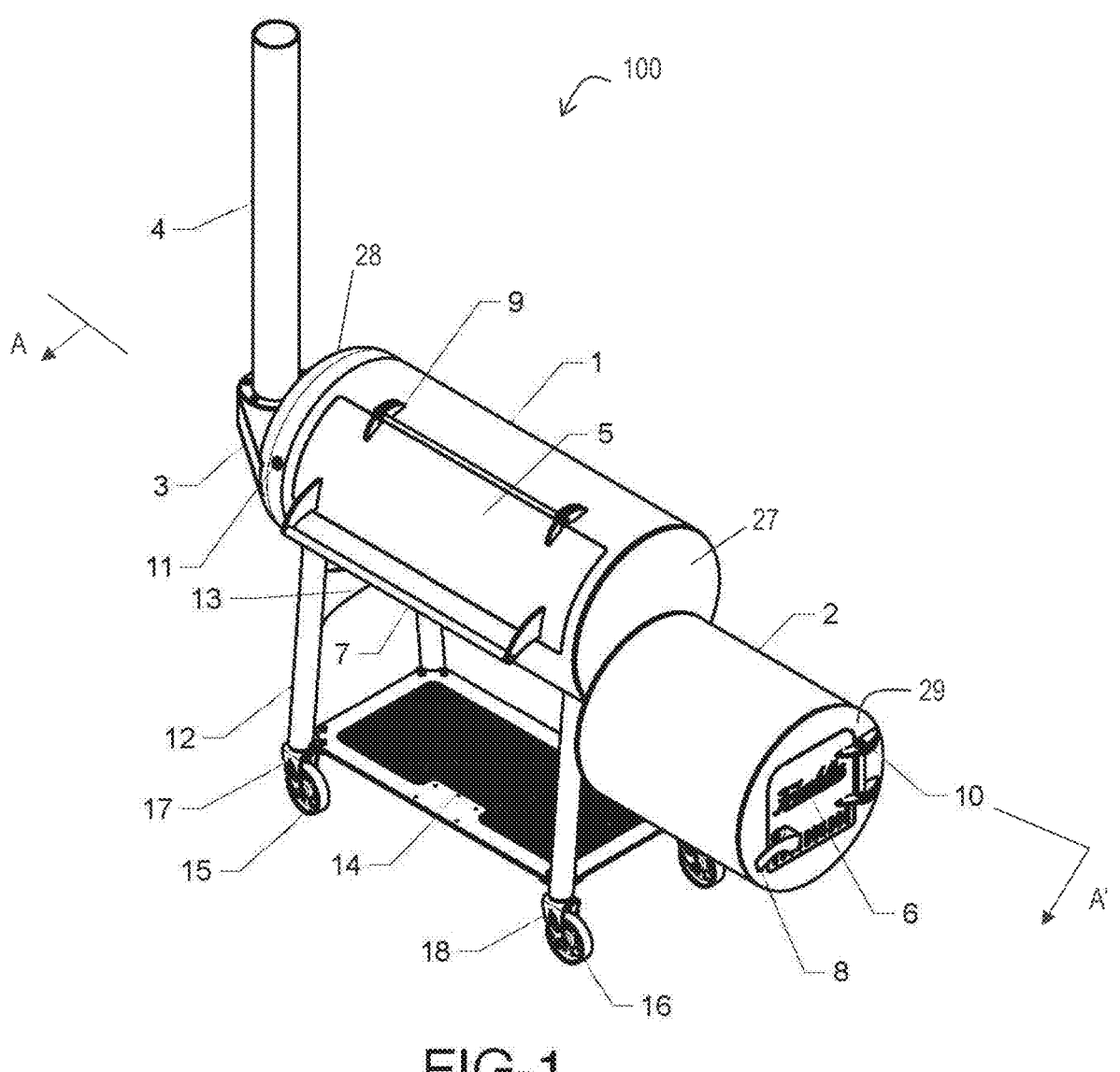
FIG. 1 illustrates a front and top perspective view of a system for barbecue cooking, according to certain embodiments of the invention.
Figure 2A:
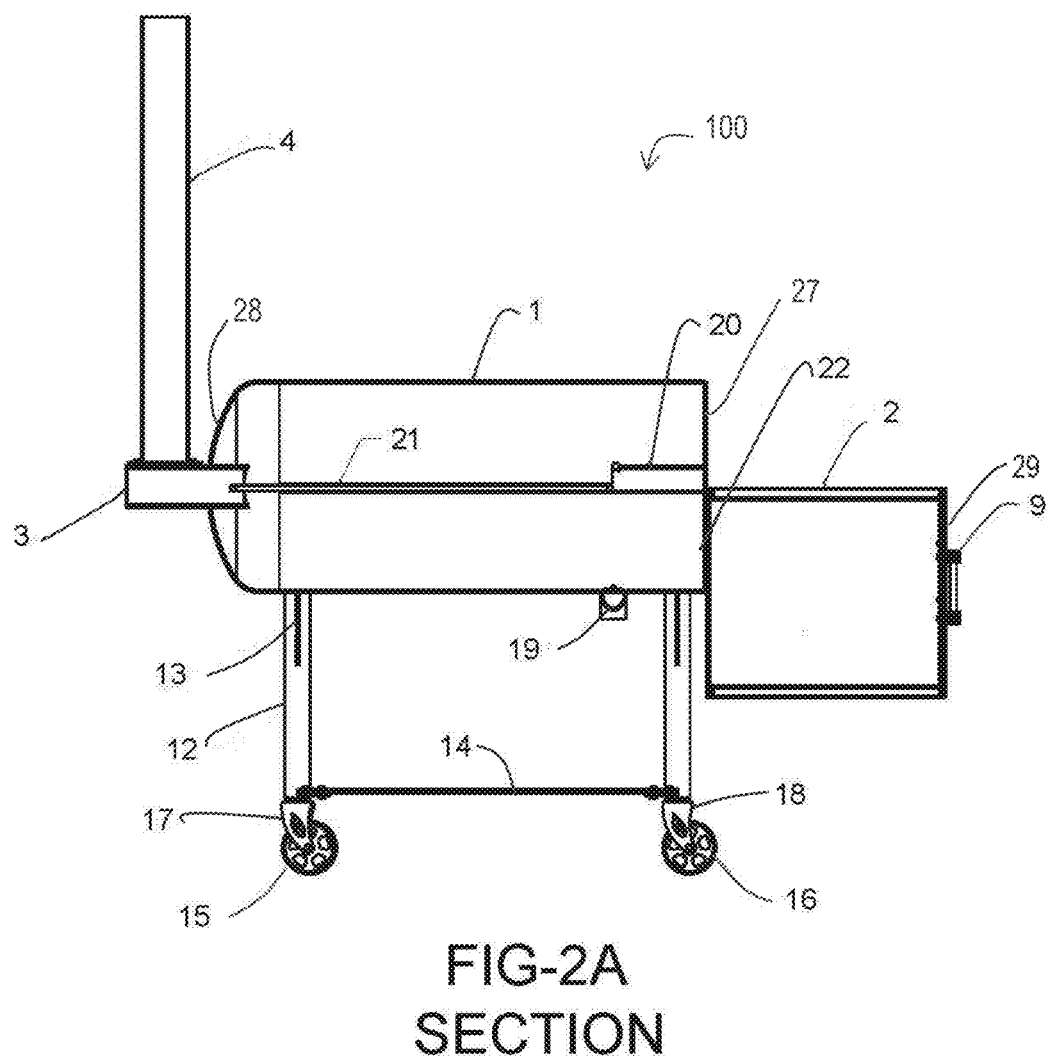
FIG. 2A illustrates a horizontal cross section view along line A-A' of FIG. 2, of a system for barbecue cooking, according to certain embodiments of the invention.
Figure 2:
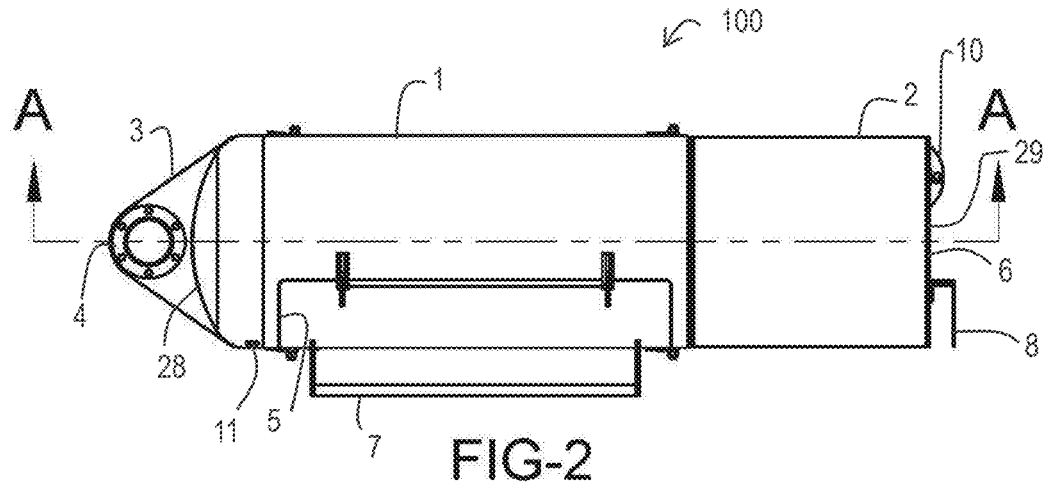
FIG. 2 illustrates a top view of a system for barbecue cooking, according to certain embodiments of the invention.

Referring to FIGS. 1-6, a system 100 includes a cook chamber 1. The cook chamber 1 is connected at a right side (in FIG. 1) to a firebox 2. A smoke collector 3 is connected to a left side (in FIG. 1) of the cook chamber 1.

The cook chamber 1 is generally cylindrical and extended. A cook chamber door 5 is connected at a top and front (in FIG. 1) side of the cook chamber 1. The cook chamber door 5 may be formed of a substantially lengthwise about quarter-circle portion of the wall of the cylinder of the cook chamber 1 or otherwise. The cook chamber door 5 may be connected to the cook chamber 1 by a hinge 9. The cook chamber door 5 may be lifted by a handle 7 to allow access to within the cylinder of the cook chamber 1.

Figure 5A:
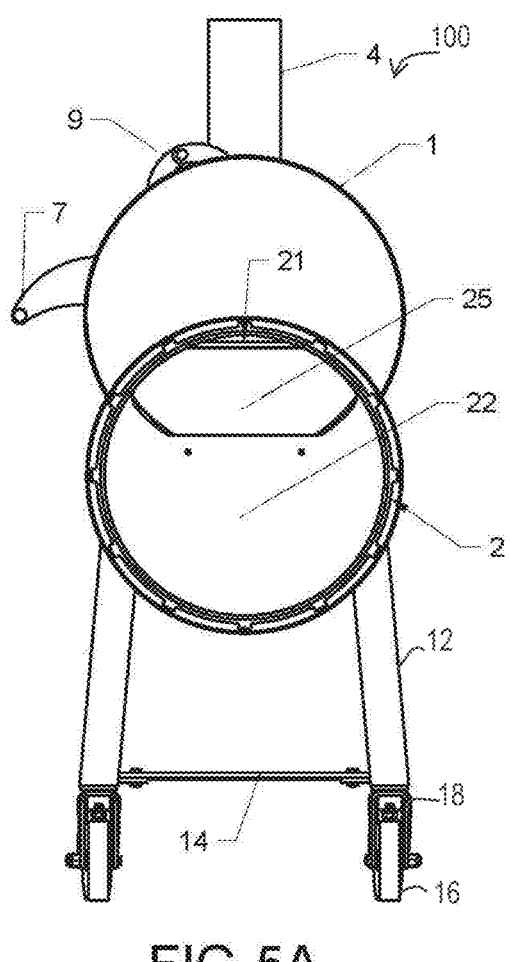
FIG. 5A illustrates a right side cross-section view along line A-A' of FIG. 5 of a system for barbecue cooking, according to certain embodiments of the invention.
Figure 5:
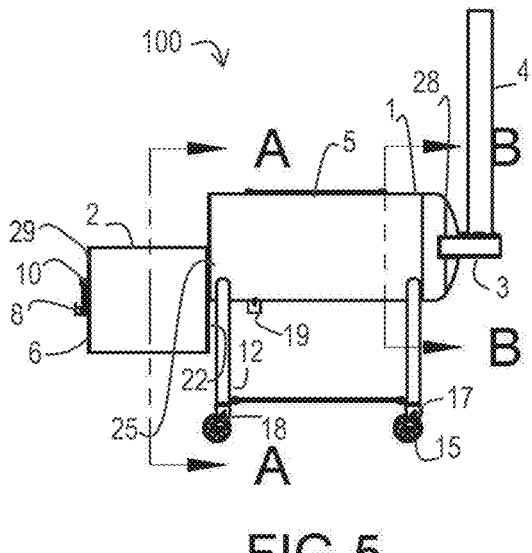
FIG. 5 illustrates a back view of a system for barbecue cooking, according to certain embodiments of the invention.
Figure 5B:
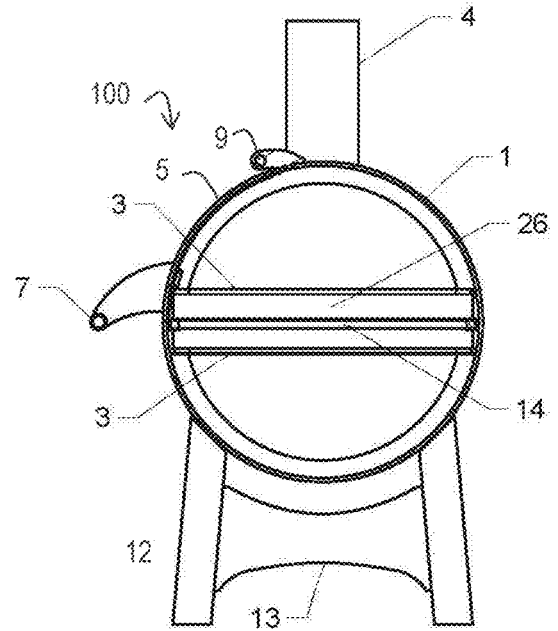
FIG. 5B illustrates a right side cross-section view along line B-B' of FIG. 5 of a system for barbecue cooking, according to certain embodiments of the invention.
Figure 6:
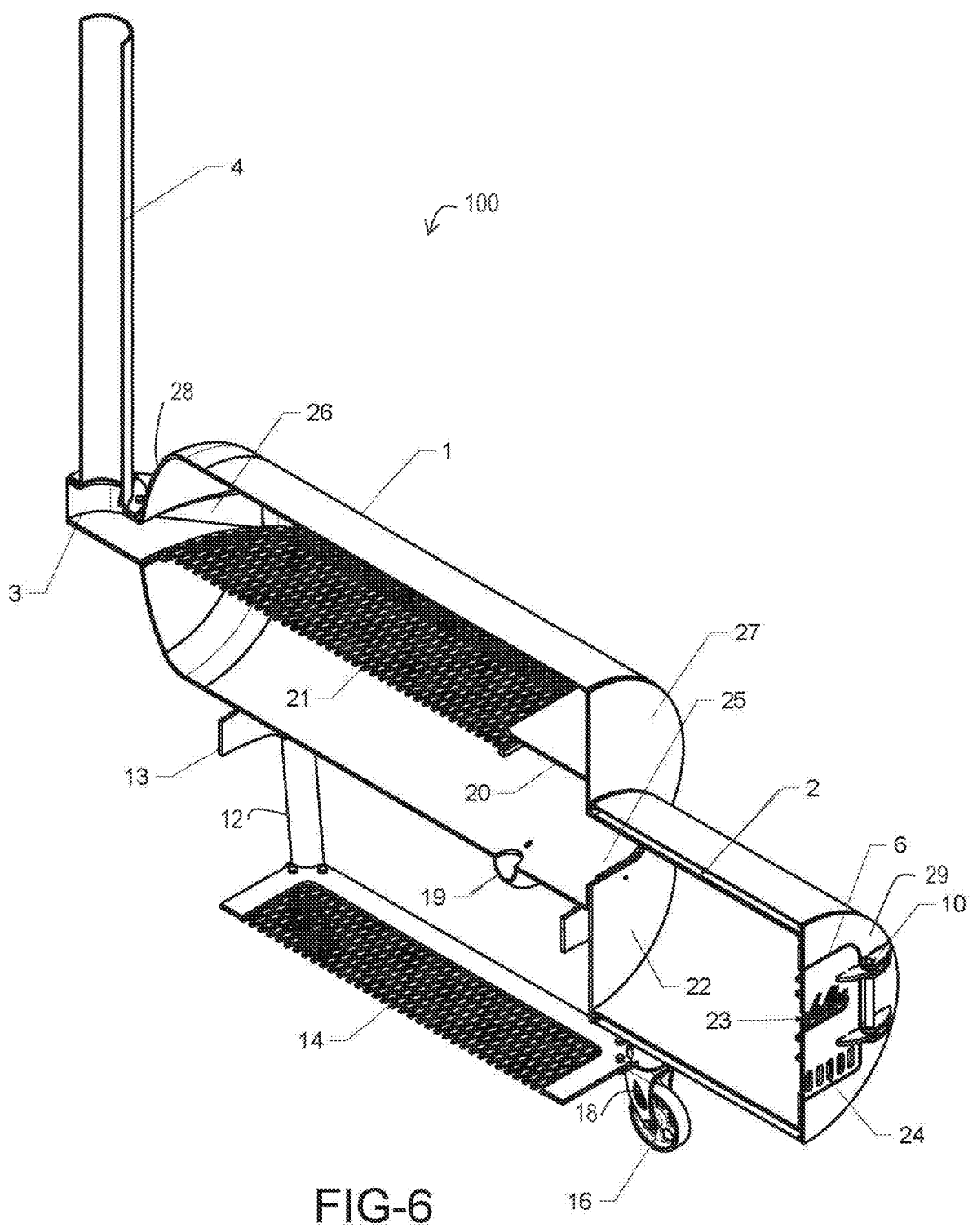
FIG. 6 illustrates a front and top perspective view in cross-section along line A-A' of FIG. 1 of a system for barbecue cooking, according to certain embodiments of the invention.

A right end (in FIG. 1) of the cook chamber 1 is partially closed by a cook chamber exchange plate 27. A left end (in FIG. 1) of the cook chamber 1 is partially closed by a semi rounded plate 28. Each of the cook chamber exchange plate 27 and the semi rounded plate 28 include or connect to fixtures (shown in FIGS. 5A and 6) that allow air flow through the cook chamber 1.

The firebox 2 may also be generally cylindrical and extended, albeit smaller in length in comparison to the cook chamber 1. The firebox 2 connects to a lower portion or lower half (in FIG. 1) of the cook chamber 1 via a cook chamber exchange plate 27, and extends by length from the cook chamber 1 substantially parallel to the length of the cook chamber 1. A throughway of an exchange plate opening 25 (shown in FIGS. 5A and 6) in the cook chamber exchange plate 27 allows fluid (gas and smoke) circulation between the firebox 2 and the cook chamber 1.

The firebox 2 includes a firebox door 6 in an end 29 of the firebox 2 opposite the cook chamber exchange plate 27 and the cook chamber 1. A hinge 10 in the end 29 connects the firebox door 6. The firebox door 6 a handle 8 of the door 6 opposing the hinge 10. The firebox door 6 can be opened and closed, in whole or part, as desired for fluid flow during cooking, for cleaning of the firebox 2, and otherwise.

A left end (in FIG. 1) of the cook chamber 1 connects to the semi rounded plate 28. The semi rounded plate 28 substantially encloses the left end. A smoke collector 3 is connected to the semi rounded plate 28 about mid or halfway (in vertical of FIG. 1) in the plate 28. The smoke collector 3 includes a throughway into the cook chamber 1, for flow of fluid from the cook chamber 1. A smokestack 4 is connected to the smoke collector 3 at the throughway. The smokestack 4 may be generally cylindrical and extended perpendicular and vertical (in FIG. 1) from the smoke collector 3. The semi rounded plate 28 may along a periphery include a threaded thermometer insert 11. The insert 11 accommodates, as desired, a thermometer to measure temperature of the left end (in FIG. 1) of the cook chamber 1 and in vicinity of the smoke collector 3.

Legs 12, for non-exclusive example, four legs, are connected externally to the cook chamber 1 and generally perpendicular and downward (in FIG. 1) extending from the cook chamber 1 at ends of the cook chamber 1 and front and back (in FIG. 1) of the cook chamber 1. Leg brackets 13 are connected to respective pairs of the legs 12 on front and back side (in FIG. 1) of the cook chamber 1. The brackets 13 provide support to the legs 12 near the underside of the cook chamber 1.

A generally planar wood grate 14 is connected at lower most (in FIG. 1) extent of the legs 12. The wood grate 14 is positioned in connection with the legs 12 to generally lie parallel to an underlying surface on which the system 100 sits, such as for non-exclusive example, a floor, ground, or other surface.

The legs 12 connected to the left (in FIG. 1) end of the cook chamber 1 near the semi rounded plate 28 are connected to respective swivel casters 15 by respective swivel caster yokes 17. The legs 12 connected to the right (in FIG. 1) end of the cook chamber 1 near the cook chamber exchange plate 27 are connected to respective locked casters 16 by respective locked caster yokes 18.

The cook chamber 1 may include or connect to a grease chute 19. Within the cook chamber 1, a heat deflector 20 is positioned above the exchange plate opening 25. A horizontally and longitudinally located and generally planar cooking grate 21 is positioned in the cook chamber 1 at the base of a smoke collector opening 26 of the smoke collector 3 and extending to just above the exchange plate opening 25 and below the heat deflector 20.

In operation, the system 100 may be employed for barbecue cooking. Fire fuel, for non-exclusive example, wood, charcoal, or other, is placed into the firebox 2. The door 6 of the firebox 2 is opened by the handle 8 and swings on the hinge 10. The fuel is placed into the firebox 2, such as resting on a base inside the horizontally disposed cylinder of the firebox 2. The fuel is ignited, for example, by match, torch, kindling, electric igniter, or otherwise.

The ignited fuel in the firebox 2 heats gas fluids in the firebox 2 and heat and smoke rise in the firebox 2. The firebox door 6 may include a fixed airflow logo cutout 23, fixed airflow slots 24, or other air intake features. These features may include, but need not necessarily, be themselves regulatable to open and close, manually or otherwise, for air flow intake regulation into the firebox 2. The fixed airflow logo cutout 23 and airflow slots 24 are, nevertheless, sufficient openings for air intake in certain embodiments.

The air intake to the firebox 2 passes through the firebox 2 towards the cook chamber 1. The pathway for fluid flow into and out of the firebox 2 connects by the firebox exchange plate 22 to the exchange plate opening 25 of the firebox exchange plate 22. The cook chamber exchange plate 27 of the cook chamber 1 includes a complementary or corresponding opening to the exchange plate opening 25 to allow fluids to flow out of the firebox 2 and into the cook chamber 1.

Exiting the exchange plate opening 25 and into the cook chamber 1, rising fluids encounter the heat deflector 20 above the exchange plate opening 25 and within the cook chamber 1. The combination of firebox 2 configuration, exchange plate opening 25, and heat deflector 20 enhance vorticity of fluids (heat and smoke) within the cook chamber 1. These fluids pass longitudinally within the cook chamber 1 to the smoke collector opening 26 of the smoke collector 3. At the smoke collector opening 26, the heated fluids rise into and upward out of the smokestack 4.

Within the cook chamber 1 is contained the generally centrally and longitudinally located and generally planar cooking grate 21. When fire is as desired within the firebox 2, for example, coals, flame, and otherwise, and temperatures in the cook chamber 1 are as desired for cooking, meats, vegetables, fruits, and other foods may be located atop the cooking grate 21 for cooking.

Although a wide variety of factors affect cooking, temperatures, cook times, and other operations of the system 100, the particular arrangements of openable firebox door 6, fixed airflow slots 24, fixed airflow logo cutout 23, and/or other air intake elements, as applicable in the embodiment, exchange plate opening 25, heat deflector 20, cooking grate 21, smoke collector 3 and smokestack 4, and others, provide efficient, thorough, and enhanced cooking with the system 100.

Non-Exclusive Example

According to certain non-exclusive example of certain embodiments, in combination with every aspect of the offset cooker must be considered to maximize airflow, from shape (barrel, square, or rectangular), the size and length of a) firebox, b) cooking chamber, c) smokestack, the type of metal used, and the thickness or gauge of the metal. Descriptions of the construction of this disclosure will present rationale for the choices behind these aspects. Further, the placement of the firebox and the location and size and shape of the exchange plate opening into the cook chamber, the construction and precise placement of a heat deflector, and the construction and precise placement of a smoke collector connected to the smokestack will disclose the embodiment of vorticity, turbulence, and convective application and how it carries particulate from naturally aspirated fire.

Smoke and heat are introduced to the process via the firebox. The firebox is, for example, according to certain non-exclusive embodiments, 20" in diameter and 22.75" long and is double lined in steel. The firebox is offset to the cook chamber so that the top of the firebox is lowered halfway down the cook chamber, with the exchange plate opening at the upper level of the firebox. The position of the firebox and placement and size (68.45 sq in) and shape of the exchange plate opening is critical to the flow of smoke and heat as it enters the cook chamber.

As the air from the fire expands in the firebox, heat and smoke are pulled rather than pushed into the cook chamber. A dean burning fire requires an excessive amount of oxygen. The vacuum created by the smokestack is calibrated by the fixed airflow slots and fixed airflow logo cutout in the firebox door. The cooker will continue to pull in fresh air through the firebox door giving the fire all the air it needs to burn cleanly. Gases in the firebox continually expand via fuel (wood or otherwise, if and as applicable) and follow the path of least resistance to escape, leaving the firebox and traveling to the cook chamber. At the exchange plate opening between the firebox and the cook chamber, heat and smoke are guided into the cook chamber. The shape of the exchange plate opening from the firebox to the cook chamber helps concentrate combustion gases eccentrically under the heat deflector into the cook chamber. The heat deflector design and location creates a boundary layer between higher velocity gases and the drag and slower moving stagnant air due to the heat deflector. The difference in these two parallels in airflow set in motion the vorticity which is critical to convective cooking.

Once smoke and heat are pulled into the cook chamber, gases disperse, and the continuum begins yet again through the heat deflector. The heat deflector is the first object smoke and heat encounter in the cook chamber. The heat deflector is flat smooth plate (appropriately dimensioned, according to certain non-exclusive embodiments) with a rounded lip that sits two inches above the cooking grate and three inches above the uppermost portion of the exchange plate opening between the firebox and the cook chamber. This position is calibrated specifically for meats typically cooked in offset cookers. The embodiment of the heat deflector is to create and maximize vorticity and turbulence throughout the cook chamber to properly introduce clean smoke while allowing meat surface moisture to escape, creating the ideal barbecue texture.

Vorticity is mathematically defined as the curl of the velocity field and a measure of the rotation of gases. Vortices (plural of vortex) are circular, spiral, or helical motions in gases which contain infinitesimals so small that they cannot be measured. As heat and smoke encounter the heat deflector, the two-dimensional airflow makes the air curl off of the rounded lip of the heat deflector plate as the velocity continues underneath while being supported by the smooth, aerodynamic design of the cook chamber. In certain non-exclusive embodiments, the design of the cook chamber is devoid of any nut, bolt or metal piece that could potentially interfere with the path of the oscillating gases in the chamber. The interior of the cook chamber is designed with a focus on naturally occurring geometry. The science of the design is to have the spotlight on the meat which creates its own turbulence, thus allowing protein to collect the water soluble particulates in the combustion gases. These principles happen every day in nature such as weather systems, tornados, and lava flows. Science has been used to exploit turbulence and this cooker design does the same. Akin to a stone in a river, where flowing water encounters the stone and creates turbulence, certain non-exclusive embodiments of offset cooker are designed and bunt to place protein in the middle of a stream of smoke, gas, and heat.

The turbulent smoke and heat move at optimal speed through the cook chamber and exits though the smoke collector. The result is cooking via convection, which creates the proper cooking environment to efficiently render fats, break down collagens, and develop the perfect barbecue texture. Similar to the functionality of a convection oven, the offset smoker in certain non-exclusive embodiments constantly distribute and circulate heated air and smoke via design. Circulating air speeds up the rate of heat transference that naturally occurs when the air from two different temperatures converge. When hot air blowing onto meat instead of just surrounding it, the meat cooks quicker and is able the create the iconic Central Texas barbecue bark while retaining moisture and fat content in the interior.

The application of smoke is also critical to smoking meat in the offset smoker. Wood produces its best, cleanest smoke after it fully combusts and catches flame at temperatures of up to about 600 degrees Fahrenheit or otherwise. Creating an efficient and clean smoke means burning off moisture, gases, and oil-soluble chemicals in the wood, eventually reaching the optimum stage where most of the smoke is water vapor. As that vapor moves through the smoker, it is attracted to the proteins of the meat and then evaporates, leaving behind traces of compounds like syringol and guaiacol, which give barbecue its flavor and aroma.

As well as providing its distinctive and desirable flavor, the smoking process acts as a preservative by dehydrating the meat surface and provides the meat with antibacterial properties found in smoke. Smoke is created when wood is consumed by fire, liberating various chemicals. These chemicals attach to the meat, in the form of sooty solid particles (oil solubles) and vapors. Throughout the smoking process, these chemicals continue to react, condense and morph in composition. Not all smoke is created equal. As wood begins to burn, the smoke deposits flavors on the meat. Thick smoke carries a higher concentration of sooty solid particles, and if not moving over the meat in a consistent flow, will become stagnant and turn the meat bitter because of a build-up of creosote. Steady and consistent airflow in the cook chamber is vital to not just to control the temperature of the fire, but to provide a clean hot burn, yielding a more water soluble and thus less carcinogenic output. One of the outcomes of this clean, efficient convection delivered via certain non-exclusive embodiments of the offset smoker technology is a flow of moving thin blue smoke to give the meat exposure required for the desired flavor and aroma enhancement.

Certain non-exclusive embodiments of the smoke collector first draw the gases to the smokestack in the cleanest, most efficient manner. The design is predicated on eliminating any stagnant or listless gas that may linger over the cooking grate (and meat). The heat deflector is positioned about two inches above the grate (or as otherwise desired in the embodiment) whereas the smoke collector's epicenter is equal to the cooking grate placement, targeting optimal heat and smoke about 2″ (or as otherwise applicable) above the geometric center of most barbecue cuts of meat. By precise placement of both devices, the turbulent gases, when entering the cook chamber, become wound around the cooking grate and move at maximum velocity, delivering a ratio of about 2 to 1 heat ration top to bottom. While moisture is escaping rapidly, it's being immediately replaced by new moisture from the wood and fuel. The smoke collector in certain non-exclusive embodiments is smooth, polished, and devoid of any metal impediments. The wing designs and compound curves are critical to functionality. Overall dimensions of certain non-exclusive embodiments of the smoker collector are sized, positioned and configured to better optimize the air flow. The smoke collector according to certain non-exclusive embodiments is optimally calibrated with the dimensions of the firebox and its fresh air intakes, allowing the fire to have the exact the amount of oxygen to burn cleanly, and to allow the cook chamber to have an optimal amount of convection.

The final integer of this calculation is the smokestack. In an effort to create the ultimate aspirational draft of a barbecue cooker, the dimension of the smokestack is imperative to creating the perfect draft. The smokestack's thin gauge steel is used to dissipate heat, thus helping to create draft. Unlike most other smokestack placements, the smokestack of certain non-exclusive embodiments of the offset smoker sits at the epicenter of the smoker collector, which is the mid-point of the end of the cook chamber. The smokestack ratio of height and width (for example, according to certain embodiments, 42 inches in height and 4.15 inch in proper diameter) lies in the delicate balance of creating proper vacuum to complement the fixed airflow openings in the firebox door.

As will be understood, wide variation is possible in the foregoing embodiments. Materials and methods of production vary widely, including metals, steel, tin, composites, and others, and weld, cut, screw, mold, and others are possible. Non-exclusive embodiments include unitized features of the system, as well as component options. Additional, alternative, and replacement elements are possible, such as, for non-exclusive example, a variety of materials, items, fixtures, enhancements, and other elements, devices, components and features are all included. Although certain operations are disclosed, numerous other steps, operations, processes and methods may be implemented in the systems.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system, comprising:
a cook chamber of cylindrical length;
a firebox connected to a first lateral end of the cook chamber, the firebox has a top extending substantially centrally along the cylindrical length of the cook chamber and a bottom displaced below the cylindrical length of the cook chamber;
an exchange plate opening between a lower portion of the cook chamber and an upper portion of the firebox for fluid flow between the firebox and the cook chamber;
a horizontal heat deflector fixed to an inside of the cook chamber at a distance from a mid-line of the cylindrical length of the cook chamber and above the exchange plate opening, the heat deflector extending laterally in the cook chamber;
a smoke collector connected to the cook chamber opposite the firebox and extending laterally from the mid-line of the cylindrical length of the cook chamber, wherein the smoke collector has a top and a bottom and the top of the smoke collector is in a same lateral plane as the heat deflector for accumulation of fluid flow from the cook chamber;
a smokestack connected to the smoke collector for expulsion of fluid flow from the smoke collector; and
a cooking grate located inside the cook chamber extending laterally and centrally in the cook chamber from a distance below the heat deflector to a middle of an entry to the smoke collector;
wherein the bottom of the smoke collector is located below the cooking grate, and the top and the bottom of the smoke collector are joined by sides and connected to the smokestack, to accumulate fluid flowing across the cylindrical length of the cook chamber and into the smokestack during use.

2. The system of claim 1, further comprising:
legs connected to the cook chamber.

3. The system of claim 2, further comprising:
casters connected to extended ends of the legs;
brackets that each connect an opposing pair of legs; and
a grate for holding wood, connected to the legs near the casters.

4. The system of claim 1, further comprising:
a thermometer insert in the cook chamber upstream from the smoke collector.

5. The system of claim 2, further comprising:
a thermometer insert in the cook chamber upstream from the smoke collector.

6. The system of claim 3, further comprising:
a thermometer insert in the cook chamber upstream from the smoke collector.

7. The system of claim 1, wherein the firebox and the exchange plate, the cooking grate, the heat deflector, the smoke collector and the smokestack are selectively sized and configured in connection to the cook chamber, for desired fluid flow between the firebox and the smoke collector.

8. The system of claim 7, further comprising:
a thermometer insert in the cook chamber upstream from the smoke collector.

* * * * *